INVENTOR.
Eino J. Luoma

BY
ATTORNEY 3,233,172
METHOD OF DETERMINING THE DIELECTRIC CONSTANT OF A MATERIAL USING CALIBRATED STANDARDS
Eino J. Luoma, Corning, N.Y., assignor to Corning Glass Works, Corning, N.Y., a corporation of New York
Filed June 27, 1960, Ser. No. 39,070
4 Claims. (Cl. 324—58)

This invention relates to measuring instruments and more particularly to a direct reading microwave dielectrometer and the method of making dielectric constant measurements by use of a free space reflectometer.

In the manufacture of fused, cast or pressed glassy or ceramic materials it has been found that the dielectric constant of the material varies directly as its composition and its density. That is, after certain materials in the glassy state or phase have been cerammed, as for instance in accordance with U.S. Patent No. 2,920,971, it has been found that there is a radical change in both the dielectric constant and the density of the material. Since, in this instance, there has been no change in composition, any variations in density from point to point in the material indicate an incomplete ceramming process which may be detected by measuring the dielectric constant of the article.

The prior art method of determining either the density or dielectric constant of the material requires that good ware be destroyed to determine the density; and, in the case of measuring the dielectric constant, the procedure is both complex and time consuming. For the latter measurements, it should be noted that the prior art requires that the measuring instrument be allowed to become stabilized for at least four hours before any readings are taken, and then the readings derived from the measuring instrument must be substituted in complex arithmetic formulae before the actual value of dielectric constant is obtained.

In a prior art method of taking dielectric constant measurements, the sample of the material under test is inserted into a shorted wave guide at a precise location. This requires that the wave guide be slotted to allow a probe to take the standing wave readings and further requires that the dimensions of the sample be held to extremely close tolerances. As for example, the dimensions of a one inch sample must be held to 1″+0.000− 0.001″ diameter. This requires a precise and time-consuming machining operation which adds materially to the overall cost and time required to determine the dielectric constant of ware being presently produced.

Still another drawback to the prior art devices manifests itself when it is necessary to measure the dielectric constant of materials which will be used at millimeter wave frequencies. In this connection, the extremely high frequencies encountered require that the prior art testing wave guide have a very small cross section and it becomes almost impossible to insert a sufficiently precise sample of the material under test into the wave guide to insure adequate accuracy.

A still further drawback to the prior art methods resides in the fact that the measurements may only be taken on samples that are absolutely flat due to the fact that the sample must be flat in the wave guide to achieve any degree of accuracy.

The ideal device, best suited to mass production techniques, must be one that is direct reading and one that will give the measurement sought within a matter of seconds. It must be non-destructive, in that the ware being measured should be capable of being returned to production and it should be capable of recording results so that records may be maintained for future comparisons. Above all, the device must not require such small sample sizes as to involve ultra-precise and time-consuming machining operations. Additionally, an important consideration is the fact that the device must also be capable of measuring curved samples such as missile nose cones.

My device satisfies the foregoing conditions in that the dielectric constant of a material is measured, utilizing microwave techniques, by placing the sample having a thickness in the neighborhood of an odd multiple of quarter wave lengths, over the end of an open wave guide and measuring the voltage standing wave ratio in the wave guide.

To prove that the dielectric constant "$\epsilon$" of the material is equal to the voltage standing wave ratio (V.S.W.R.) "$\rho$" measured at quarter wave points, the complex voltage reflection coefficient of a solid wall is first examined in the expression:

(1) $$R = \frac{-r(e^{j\phi} - e^{-j\phi})}{e^{j\phi} - r^2 \cdot e^{-j\phi}}$$

where:
$R$=Complex voltage reflection coefficient,
$r$=Interface voltage reflection coefficient.

At normal incidence (2) $$r = \frac{\sqrt{\epsilon} - 1}{\sqrt{\epsilon} + 1}$$

and (3) $$\phi = \frac{2\pi d \sqrt{\epsilon}}{\lambda}$$

where:

$\epsilon$=Dielectric constant
$d$=Wall thickness,
$\lambda$=Free space wave lengths,
$\varphi$=Electrical thickness.

Reducing Equation 1 into its absolute value and angle or argument and solving for $|R|^2$:

(4) $$|R|^2 = \frac{4r^2 \sin^2 \phi}{(1-r)^2 + 4r^2 \sin^2 \phi}$$

substituting (2) in (4)

(5) $$|R|^2 = \frac{\sin^2 \phi}{\frac{4\epsilon}{(1-\epsilon)^2} + \sin^2 \phi}$$

Since at $\lambda/4$ points, or at any odd multiple thereof, $\sin \phi = -1$, equation 5 may be reduced to:

(6) $$|R|^2_{\lambda/4} = \frac{1}{\frac{4\epsilon}{(1-\epsilon)^2} + 1}$$

When $|R|_{\lambda/4}$ is the power reflection coefficient measured at odd quarter wave multiyles.

Solving for $|R|_{\lambda/4}$ we obtain:

(7) $$|R|_{\lambda/4} = \frac{\epsilon - 1}{\epsilon + 1}$$

and solving for (8) $$\epsilon = \frac{1 + |R|_{\lambda/4}}{1 - |R|_{\lambda/4}}$$

Since (9) $$= \frac{V_i + V_r}{V_i - V_r}$$

where:

$\rho$=Voltage standing wave ratio (V.S.W.R.),
$V_i$=Incident voltage,
$V_r$=Reflected voltage, and

(10) $$|R| = \frac{V_r}{V_i}$$

rewriting (9)

(11) $$\rho = \frac{1+\frac{V_R}{V_f}}{1-\frac{V_r}{V_f}}$$

substituting (10) in (11)

(12) $$\rho = \frac{1+|R|}{1-|R|}$$

since as shown at (8)

$$\epsilon = \frac{1+|R|_{\lambda/4}}{1-|R|_{\lambda/4}}$$

then

(13) $$\rho_{\lambda/4} = \epsilon$$

where: $\rho_{\lambda/4}$ = V.S.W.R. at odd multiple quarter wave multiples.

It is therefore, an important object of the present invention to measure the dielectric constant of a material utilizing microwave techniques.

Another important object of the present invention is to measure the dielectric constant of a material utilizing a direct recording instrument.

Still another important object of the present invention is to measure the dielectric constant of a material utilizing a direct recording instrument that is quick acting and accurate.

Another object of the present invention is to measure the dielectric constant of a material utilizing non-destructive techniques.

A further object of the present invention is to measure the dielectric constant of a material utilizing the device that is amenable to mass production techniques.

The features of my invention which I believe to be novel are set forth with particularity in the appended claims. My invention in itself, however, both as to its organization and method of operation, together with further objects and advantages thereof, may best be understood by reference to the following description taken in conjunction with the accompanying drawing in which:

Figure 1:
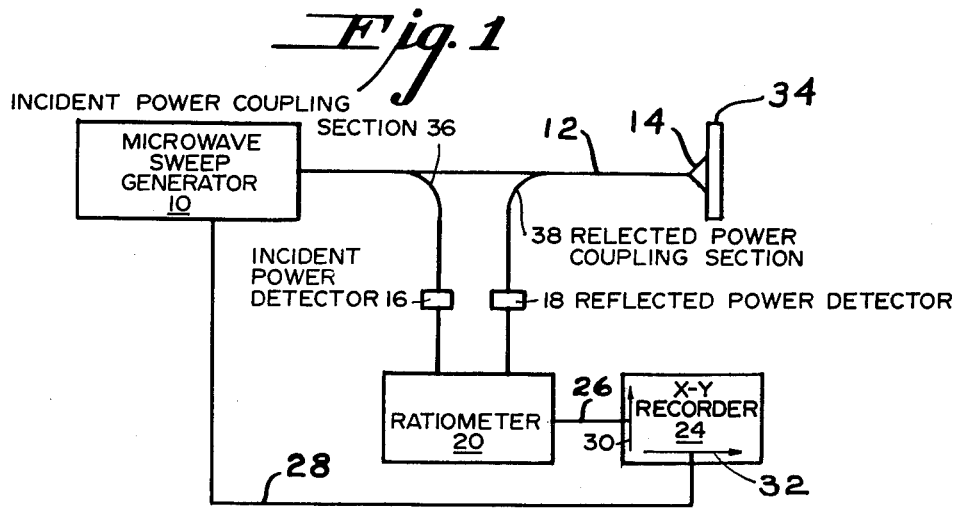
FIG. 1 represents a block diagram of the instant invention.

Referring now to FIG. 1, an embodiment of the instant invention is depicted in block diagram form, wherein 10 represents a microwave sweep generator sweeping a range of frequencies from about 8,200 to 12,400 megacycles per second. The sweep rate is variable and may be made to vary from over the indicated frequency range at rates ranging from .013 second to 130 seconds. The main output of the sweep generator 10 is applied at an input to wave guide 12 which is a standard wave guide configuration having dimensions of approximately 0.9 inch by 0.4 inch. The military nomenclature of this wave guide is RG 52/U. Wave guide 12 is terminated in a horn-shaped termination 14 with the sample, whose dielectric is to be measured, placed on the mouth thereof. The function and dimensions of the horn section will be described subsequently. Coupling section 36 samples a portion of the forward or incident power and is detected in any one of many well-known fashions by detector 16 which may be either a bolometer or a crystal. The output thereof, or the detected incident power is applied as one input to the ratiometer 20. Similarly, the reflected power is coupled through wave guide section 38 to detector 18 and the detected output thereof is applied as the second input to ratiometer 20. Ratiometer 20 combines the detected reflected power with the detected incident or forward power to arrive at an output which represents the ratio of reflected power to forward power or the power reflection coefficient $|R|^2$. In any plot of $|R|^2$ vs. V.S.W.R. ($\rho$) it will be seen that over very narrow ranges of V.S.W.R., $\rho$ is directly proportional to $|R|^2$. Therefore, Equation 13 may be rewritten as:

(14) $$\rho_{\lambda/4} = \epsilon \propto |R|^2_{\lambda/4}$$

Since, as is known, voltage standing wave ratio and power reflection coefficient are maximum when the frequency is such that thickness of the sample corresponds to an odd multiple quarter wave length, it may be seen that the maximum value of the ratiometer output, which is applied through lead 26 as input to an $x$—$y$ recorder 24, is proportional to the dielectric constant of the sample. This input causes a needle to move in a vertical direction as indicated by the double-headed arrow 30 to plot power reflection coefficient along the axis of ordinate. The sweep rate information from sweep generator 10 is applied through output lead 28 as an input to $x$—$y$ recorder 24 to govern the rate at which the needle or recording device moves in direction 32. This sweep information is plotted on the axis of abscissa to act as a frequency scale.

Figure 2:
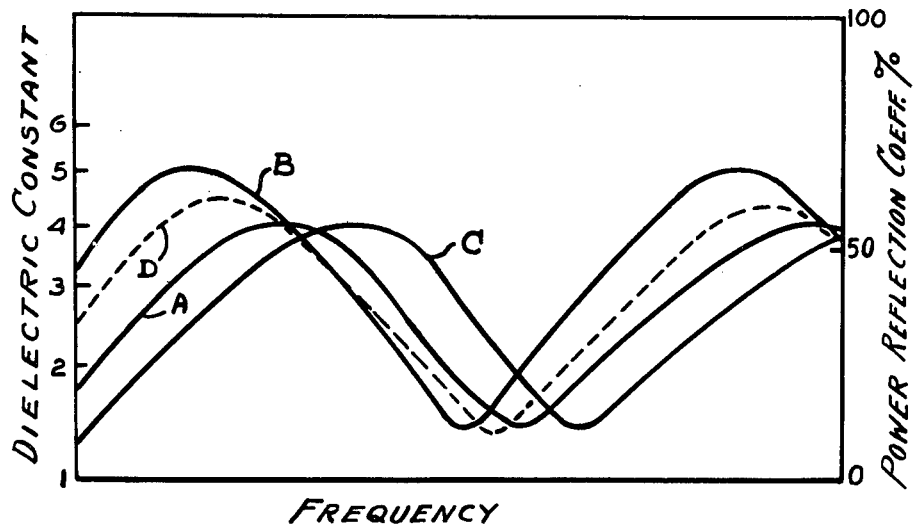
FIG. 2 represents theoretical curves for dielectric constant.

Since the output of ratiometer 20 may be expressed as the power reflection coefficient, the pilot of curves of power reflection coefficient versus frequency, as recorded by recorder 24, will appear as in FIG. 2. Curve A may be, for example, the curve of a material having a dielectric constant of 4.0 with a sample thickness equal to D'. Curve B may be, for example, the curve for a dielectric constant of 5.0 with the thickness of the sample equal to D'. Curve C would then represent the curve for a sample having a dielectric constant of 4.0 with a thickness equal to D'. In FIG. 2, the axis of ordinate may serve as the dielectric constant scale as well as the scale for power reflection coefficient $|R|^2$. The height of the peak represents the dielectric constant of the material under test over a range of dielectric constants such as 4 to 5. With suitable standards (a minimum of 2) a dielectric constant scale is laid out along the axis of ordinate.

To utilize my device at its maximum capabilities, it is suggested that the device be calibrated initially. Any further calibration thereafter will be unnecessary if the dielectric constant of the unknown material is within the range or close to the limits as set by the standards.

One method of calibrating my device involves the use of a minimum of two standards of known but different dielectric constants, each standard preferably having the same thickness. The procedure is followed twice, once for each sample, and involves placing the standards separately over the mouth of the horn 14, causing the sweep generator 10 to sweep its range of frequency and plotting a curve of power reflection coefficient versus frequency on the $x$—$y$ recorder 24. This will produce a pair of curves such as A and B in FIG. 2 wherein the amplitude at the peak of each curve represents the dielectric constant of the known standard.

Having thus determined the limits within which my device is accurately calibrated, a sample of material having a dielectric constant which is not known exactly but is known to be not substantially beyond the range established by the calibrating standards is then placed over the mouth of horn 14 and the previously outlined procedure is repeated. This will result in a plot of power reflection coefficient versus frequency as represented by the dashed curve D in FIG. 2 wherein the dielectric constant is also determined by the amplitude of the peak. In this instance, it will be seen that the dielectric constant of the sample represented by curve D, is approximately 4.5 since it falls approximately half way between the limits of 4.0 and 5.0 as represented by the peaks of curves A and B respectively.

The axis of abcissa of the family of curves of FIG. 2 is frequency, but it will now become obvious to those skilled in the art, that it can be also considered as a sample thickness scale. With suitable standards having differing thicknesses but the same dielectric constant as the sample, the thickness of a sample can be read directly from the $x$—$y$ chart by reading the position of the peak or valley along the horizontal scale.

I have found that my device is capable of measuring both the dielectric constant and/or the thickness of a sample that is either curved or flat. For flat samples the best design was found to be a horn-shaped terminating element wherein the horn section is at 45° to the wave guide immediately preceding and having a side length of about .25 inch. The edges are made sharp to minimize any ground plane effect. For curved samples the same flare is used except the flared or horn section is made up of 2 to 4 overlapping layers of spring fingers to assure good coupling and to minimize any leakage.

Utilizing a system previously described, it is also possible that very small differences of dielectric constants such as 5.5 and 5.7, for example, can be expanded over a distance of about 6 inches or more. Correspondingly, a change in sample thickness of 0.001 inch can easily be spread over a distance of from 1 to 2 inches.

While I have described what is considered a preferred embodiment of my invention, it will be obvious to those skilled in the art that various modifications may be made therein without departing from the inventive concept contained therein, and it is, therefore, aimed in the appended claims to cover all such changes and modifications as fall within the true spirit and scope of my invention.

What is claimed is:

1. A method of determining the dielectric constant of a material comprising the steps of terminating one end of a wave guide with a microwave sweep frequency generator, propagating a range of swept frequencies from said sweep generator along said wave guide, terminating the other end of said wave guide with a first standard having a first known dielectric constant, detecting incident voltage in said wave guide due to said first standard, detecting reflected voltage in said wave guide due to said first standard, combining said incident and reflected voltages to obtain a measure of power reflection coefficient in said wave guide due to said first standard, determining the amplitude of the peak value of said power reflection coefficient of said first standard, said peak value representing the dielectric constant of said first standard, replacing said first standard with a second standard having a second known dielectric constant differing from said first known dielectric constant, propagating said range of swept frequencies from said sweep generator along said wave guide, detecting incident voltage in said wave guide due to said second standard, detecting reflected voltage in said wave guide due to said second standard, combining said incident and reflected voltages to obtain a measure of power reflection coefficient in said wave guide due to said second standard, determining the amplitude of the peak value of said power reflection coefficient of said second standard, said second determined peak value representing the dielectric constant of said second standard, replacing said second standard with a sample of unknown dielectric constant, propagating said range of swept frequencies from said sweep generator along said wave guide, detecting incident voltage in said wave guide due to said sample of unknown dielectric constant, detecting reflected voltage in said wave guide due to said sample of unknown dielectric constant, combining said last mentioned incident and reflected voltages to obtain a measure of power reflection coefficient in said wave guide due to said sample of unknown dielectric constant, determining the amplitude of the peak value of power reflection coefficient of said sample, said last determined peak value indicating the dielectric constant of said sample of unknown dielectric constant.

2. A method of determining the dielectric constant of a material comprising the steps of terminating one end of a wave guide with a microwave sweep frequency generator, propagating a range of swept frequencies from said sweep generator along said wave guide, terminating the other end of said wave guide with a first standard having a first known dielectric constant, detecting incident voltage in said wave guide due to said first standard, detecting reflected voltage in said wave guide due to said first standard, combining said incident and reflected voltages to obtain a measure of power reflection coefficient in said wave guide due to said first standard plotting a first curve of power reflection coefficient versus frequency for each of said swept frequencies, the amplitude of the peak of said first curve representing the dielectric constant of said first standard, replacing said first standard with a second standard having a second known dielectric constant differing from said first dielectric constant, propagating said range of swept frequencies from said sweep generator along said wave guide, detecting incident voltage in said wave guide due to said second standard, combining said incident and reflected voltages to obtain a measure of power reflection coefficient in said wave guide due to said second standard, plotting a second curve of power reflection coefficient versus frequency for each of said swept frequencies, the amplitude of the peak of said second curve representing the dielectric constant of said second standard, replacing said second standard with a sample of unknown dielectric constant, propagating said range of swept frequencies from said sweep generator along said wave guide, detecting incident voltage in said wave guide due to said sample of unknown dielectric constant detecting reflected voltage in said wave guide due to said sample of unkown dielectric constant, combining said last mentioned incident and reflected voltages to obtain a measure of power reflection cofficient in said wave guide due to said sample of unknown dielectric constant, plotting a third curve of power reflection coefficient versus frequency for each of said swept frequencies, the amplitude of the peak of said third curve representing the dielectric constant of said sample of unknown dielectric constant.

3. The method of claim 2 wherein the steps of plotting said curves comprises applying said power reflection coefficient measurement to one axis of a $x$—$y$ recorder and applying the sweep rate of said sweep generator to another axis of said recorder.

4. A method of determining the thickness of a material having a known dielectric constant comprising the steps of terminating one end of a wave guide with a microwave sweep frequency generator, propagating a range of swept frequencies from said sweep generator along said wave guide, terminating the other end of said wave guide with a first standard having the same dielectric constant as said material and having a first known thickness, detecting incident voltage in said wave guide due to said first standard, detecting reflected voltage in said wave guide due to said first standard, combining said incident and reflected voltages to obtain a measure of power reflection coefficient in said wave guide due to said first standard, determining a first displacement of the peak value of said power reflection coefficient of said first standard, said first displacement representing the thickness of said first standard, replacing said first standard with a second standard having the same dielectric constant as said material and having a second known thickness differing from said first known thickness, propagating said range of swept frequencies from said sweep generator along said wave guide, detecting incident voltage in said wave guide due to said second standard, detecting reflecting voltage in said wave guide due to said second standard, combining said incident and reflected voltages to obtain a measure of power reflection coefficient in said wave guide due to said second standard, determining a second displacement of the peak valve of said power reflection coefficient of said second standard, said second displacement representing the thickness of said second standard, replacing said second standard with said material, propagating said range of swept frequencies from said sweep generator along said wave guide, detecting incident voltage in said wave guide due to said material, detecting reflected voltage in said wave guide due to said material, combining said last mentioned incident and reflected voltages to obtain a measure of power reflection coefficient in said wave guide due to said material, determining the displacement of the peak value of power reflection coefficient of said material, said last mentioned displacement corresponding to the thickness of said material.

References Cited by the Examiner

UNITED STATES PATENTS

| | | | |
|---|---|---|---|
| 2,817,813 | 12/1957 | Rowen et al. | 324—58.5 |
| 2,611,804 | 9/1952 | Zaleski | 324—58.5 |
| 3,025,463 | 3/1962 | Luoma et al. | 324—58.5 |

OTHER REFERENCES

Dakin et al.: "Microwave Dielectric Measurements," Journal of Applied Physics, volume 18, No. 9, September 1947, pages 789–796.

Hewlett-Packard: Journal, volume 6, No. 1–2, September through October 1954, pages 1–7, "The H.P. Microwave Reflectometer," published by Hewlett-Packard Company, 275 Page Mill Road, Palo Alto, Calif.

Pappas: "Measuring Microwave Impedance With the Reflectometer," Tele-Tech and Electronic Industries, May 1956; pages 72, 73, 128 and 129.

Riblet: "A Swept-Frequency 3-Centimeter Impedance Indicator," Proceedings of the IRE, December 1948, pages 1493–1499.

WALTER L. CARLSON, *Primary Examiner.*

SAMUEL BERNSTEIN, *Examiner.*